(12) United States Patent
    Ferrel

(10) Patent No.: US 7,004,186 B2
(45) Date of Patent: Feb. 28, 2006

(54) SURGE RELIEF APPARATUS FOR A VALVE

(75) Inventor: Ken G. Ferrel, Los Alamitos, CA (US)

(73) Assignee: The Boeing Company, Chicago, IL (US)

( * ) Notice: Subject to any disclaimer, the term of this patent is extended or adjusted under 35 U.S.C. 154(b) by 260 days.

(21) Appl. No.: 10/610,475

(22) Filed: Jun. 30, 2003

(65) Prior Publication Data
    US 2004/0261858 A1    Dec. 30, 2004

(51) Int. Cl.
    *F16K 17/04*    (2006.01)
(52) U.S. Cl. .................... 137/12; 137/599.18; 251/318
(58) Field of Classification Search ............... 137/12 I, 137/599.18, 601.2; 251/318, 321
    See application file for complete search history.

(56) References Cited

U.S. PATENT DOCUMENTS

| 150,343 | A | * | 4/1874 | Miller .................... 137/599.18 |
| 1,405,192 | A | * | 1/1922 | Eustis .................... 137/599.18 |
| 2,351,775 | A | * | 6/1944 | McMurry .............. 137/599.18 |
| 3,476,146 | A | * | 11/1969 | Dolter .................... 137/601.13 |
| 3,599,658 | A | | 8/1971 | Kruzan et al. ........... 137/116.5 |
| 4,040,439 | A | | 8/1977 | Uppal ........................ 137/115 |
| 4,850,392 | A | | 7/1989 | Crump et al. ................ 137/513 |
| 4,883,148 | A | | 11/1989 | Welch ......................... 184/6.4 |
| 4,895,219 | A | | 1/1990 | Welch et al. ................. 184/6.4 |
| 4,949,750 | A | | 8/1990 | Goodwin et al. ........... 137/510 |
| 5,038,823 | A | | 8/1991 | Kimura et al. ......... 137/505.18 |
| 5,065,982 | A | * | 11/1991 | Shih ........................... 251/320 |
| 5,265,645 | A | | 11/1993 | Goodwin ................ 137/512.15 |
| 5,305,790 | A | * | 4/1994 | Giacomini ............. 137/599.18 |
| 5,479,978 | A | | 1/1996 | Zenkich .................... 137/493.3 |
| 5,775,357 | A | | 7/1998 | Regna et al. .................. 137/43 |
| 5,785,082 | A | | 7/1998 | Geis et al. ............. 137/516.29 |
| 5,836,352 | A | | 11/1998 | Nimberger ............. 137/614.19 |
| 6,079,519 | A | | 6/2000 | Lottes ...................... 184/105.1 |
| 6,367,775 | B1 | | 4/2002 | Nimberger ................... 251/321 |

OTHER PUBLICATIONS

Fill Valve Engineering Drawing, Aug. 5, 1994 (4 pgs.).
US 4,784,176, 11/1988, Clough (withdrawn)

* cited by examiner

*Primary Examiner*—Stephen M. Hepperle
(74) *Attorney, Agent, or Firm*—Harness Dickey & Pierce, P.L.C.

(57) ABSTRACT

A valve apparatus that includes surge relief includes a valve housing having an inlet port, an outlet port, and a poppet seat between the inlet port and the outlet port. The valve also includes a first moveable poppet piece having a closed position against the poppet seat that closes the valve. At least one surge discharge port passes through the first moveable poppet piece. The valve also includes a second moveable poppet piece compressionally biased in a position to seal the fluid discharge port or ports in the first moveable poppet piece. The second moveable poppet piece is responsive to a surge pressure when the valve is closed to unseal the surge discharge port or ports temporarily to relieve the surge pressure.

7 Claims, 4 Drawing Sheets

SURGE RELIEF APPARATUS FOR A VALVE

FIELD OF THE INVENTION

The present invention relates to methods and apparatus for the relief of surges occurring as a result of a valve being turned off. Such surges are often referred to by the term "water hammer" even though the liquid involved may not be water.

BACKGROUND OF THE INVENTION

Sudden stoppage of liquid flow causes pressure surges in piping systems. These surges occur because shutting the flow of liquid sends an abrupt pressure wave back up the line towards the flow source. This pressure wave creates a phenomenon known as "water hammer" that shocks pipes and creates a hammer-like noise. The water hammer phenomenon can be intense enough to break pipe supports or even rupture pipes. The water hammer phenomenon is not limited to pipes carrying water, and also occurs with other types of liquids, for example, in association with fill valves dispensing jet fuel. For example, fast closure of a fill valve in an aircraft fuel tank can result in a surge pressure wave of 600 to 1,000 psig (4134 to 6890 kPa) being generated at the valve closure point and traveling upstream into inlet piping at a rate of approximately 2800 feet/second (853.44 meters/second).

One known method for reducing water hammer is to provide surge relief valves installed upstream of a fill valve or as a separate surge relief valve attached to the fill valve itself to relieve the surge. Ideally, the separate relief valve is installed on the fill valve itself, at the actual location of the surge pressure wave generation. However, the fill valve must be able to accommodate the separate surge relief valve attachment, and there must be space for the attachment at the fill valve location. If the fill valve does not incorporate a relief valve, the surge relief valve may be located on the inlet pipe as close to the fill valve as possible, but such location may be limited by interference from surrounding pipes or structure.

SUMMARY OF THE INVENTION

Some configurations of the present invention thus provide a valve apparatus including surge relief. The valve apparatus includes: a valve housing having an inlet port, an outlet port, an upstream chamber proximate the inlet port, a downstream chamber proximate the outlet port, and a poppet seat between the upstream chamber and the downstream chamber. The valve also includes an actuating shaft inside the valve housing and a multipiece poppet mechanically coupled to the actuating shaft. The multipiece poppet includes at least a first moveable poppet piece that sealingly engages the poppet seat when the valve is set to a closed position. In addition, there is at least one fluid discharge port through the first moveable poppet piece. The multipiece poppet also includes a second moveable poppet piece that is compressionally biased to seal the fluid discharge port or ports in the first moveable poppet piece.

In other configurations, a valve apparatus is provided that includes surge relief. These configurations include: a valve housing having an inlet port, an outlet port, and a poppet seat between the inlet port and the outlet port. The valve also includes a first moveable poppet piece having a closed position against the poppet seat that closes the valve. At least one surge discharge port passes through the first moveable poppet piece. The valve also includes a second moveable poppet piece compressionally biased in a position to seal the fluid discharge port or ports in the first moveable poppet piece. The second moveable poppet piece is responsive to a surge pressure when the valve is closed to unseal the surge discharge port or ports temporarily to relieve the surge pressure.

Still other configurations of the present invention provide a valve apparatus that includes surge relief. In these configurations, the apparatus includes: a valve housing having fluid inlet means for inputting a fluid, and fluid outlet means for outputting the fluid. The valve further includes valve closing means inside the valve housing for closing a fluid path between the inlet means and the outlet means. There is at least one surge relief port through the valve closing means. In addition, the valve includes surge relief means responsive to a surge pressure in the fluid for opening the surge relief port or ports to allow fluid to flow between the fluid input means and the fluid output means to relieve the surge pressure.

In still other configurations, a method for relieving a pressure surge in a flow of fluid when a valve is closed is provided. The method includes: passing a flow of fluid through a valve housing; seating a first moveable poppet piece against a poppet seat within the valve housing to close the valve and thereby generate a pressure surge; opening at least one surge relief port through the first moveable poppet piece in response to the pressure surge; and closing the surge relief port or ports through the first moveable poppet piece when the pressure surge is relieved.

It will be appreciated that various configurations of the present invention reduce or eliminate the need for externally attached surge relief valves. In addition, various configurations of the present invention offer resistance to damage during installation and can be located close to the source of a surge, thereby reducing the likelihood and intensity of such surges. Also, various configurations of the present invention provide surge relief without external discharge of surge relief fluid flow, and thus do not require means for capturing or retaining surge relief fluid. Moreover, various configurations of the present invention can be installed in line, outside of a tank. Moreover, configurations of the present invention are useful to various types of fluid flows, including, but not limited to, fuel flows, aircraft fuel flows, oil flows, and water flows.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
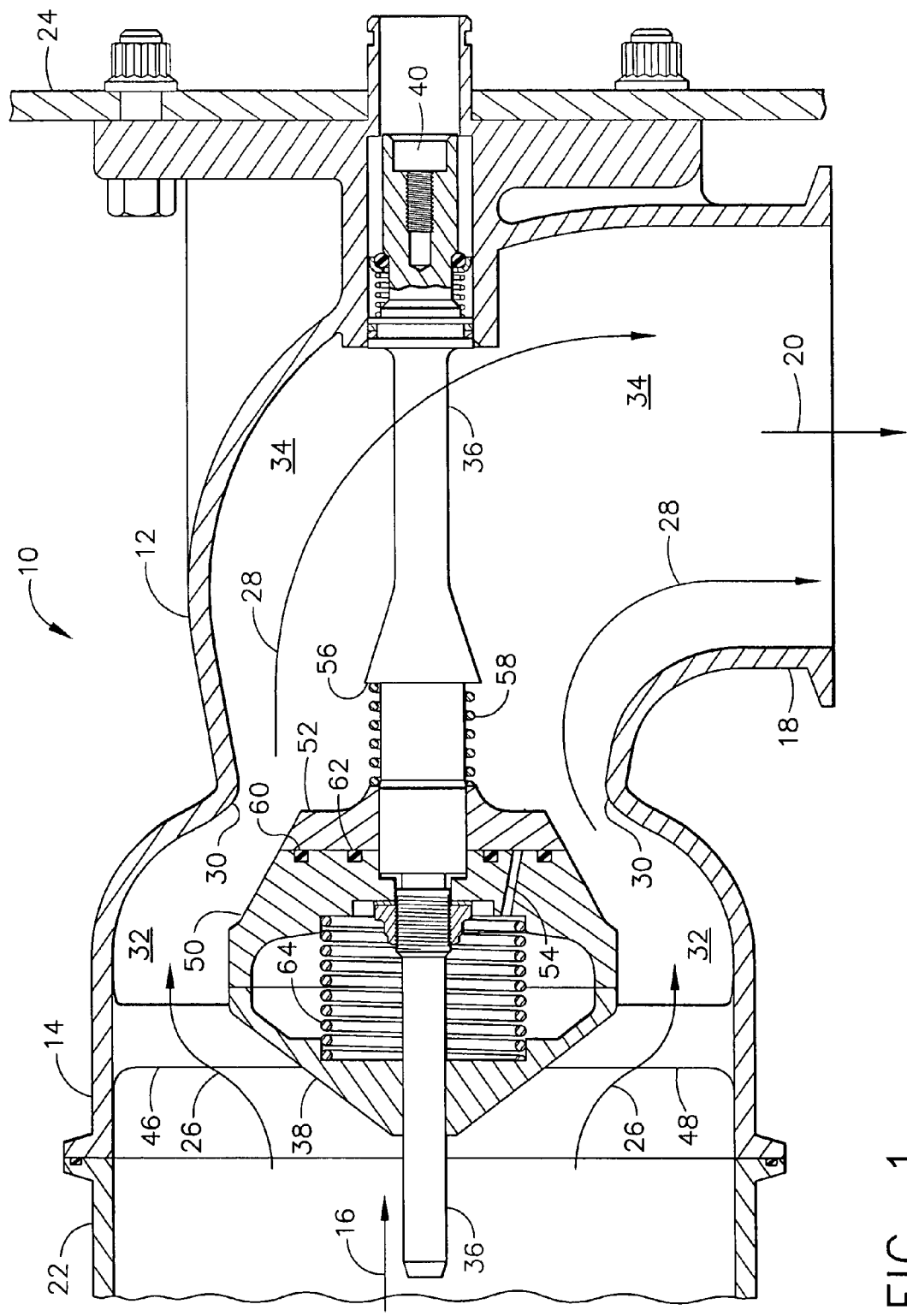
FIG. 1 is a cross-sectional view of one of the various configurations of a valve in accordance with the present invention, the valve being shown in an open position. The valve represented in the figure is a fill valve in an aircraft fuel tank.

In various configurations of the present invention and referring to FIG. 1, a fill valve apparatus 10 is provided that includes and provides surge relief within fill valve apparatus 10 itself. Fill valve apparatus 10 includes a valve housing 12 that has a first orifice rim 14 surrounding an inlet port 16 and a second orifice rim 18 surrounding an outlet port 20. Also shown in FIG. 1 is a fill pipe 22 that couples to first orifice rim 14. Fill valve apparatus 10 may be installed inside a aircraft fuel tank (one wall 24 of which is shown in FIG. 1), and fill pipe 22 may be utilized in such an installation for filling the fuel tank with fuel. However, various configurations of the present invention are more generally useful in cases in which surge relief is desired, and these configurations are not limited to aircraft installations or installations in which the liquid flowing through fill valve apparatus 10 is a fuel. For example, valve apparatus 10 may be installed in ground fueling equipment for aircraft, in refinery pipelines, oil transmission lines, or water transmission lines. In some of these configurations, valve apparatus 10 is installed at the source of a surge. In some configurations, valve apparatus 10 is installed in line, but not necessarily at, in, or close to a tank.

The flow of liquid into valve housing 12 is indicated by arrows 26. The flow of liquid out of valve housing 12 is indicated by arrows 28.

A poppet seat 30 between inlet port 16 and outlet port 20 divides the interior of valve housing 12 into an upstream chamber 32 proximate inlet port 16 and a downstream chamber 34 proximate outlet port 20. An actuating shaft 36 inside valve housing 12 extends from a fixed poppet piece 38 to an actuating mechanism 40. In various configurations, actuating mechanism 40 may be controlled remotely, for example by a solenoid (not shown in FIG. 1). Fixed poppet piece 38 in some configurations is also supported in some configurations by one or more flanges or rods 46, 48 that are positioned so as not to interfere with a flow 26 of liquid into upstream chamber 32.

A multipiece movable poppet 50, 52 is mechanically coupled to actuating shaft 36. A first moveable poppet piece 50 is configured to sealingly engage poppet seat 30 when fill valve 10 is set to a closed position. In this manner, poppet seat 30 acts as a valve seat, and moveable poppet 50 acts as a valve, and together comprise a valve closing means. At least one fluid discharge port 54, such as a hole, is provided through first moveable poppet piece 50. A second moveable poppet piece 52 is also provided and is configured to compressionally and sealingly bias fluid discharge port or ports 54 against a normal pressure of fluid, for example, a normal fueling pressure.

Figure 2:
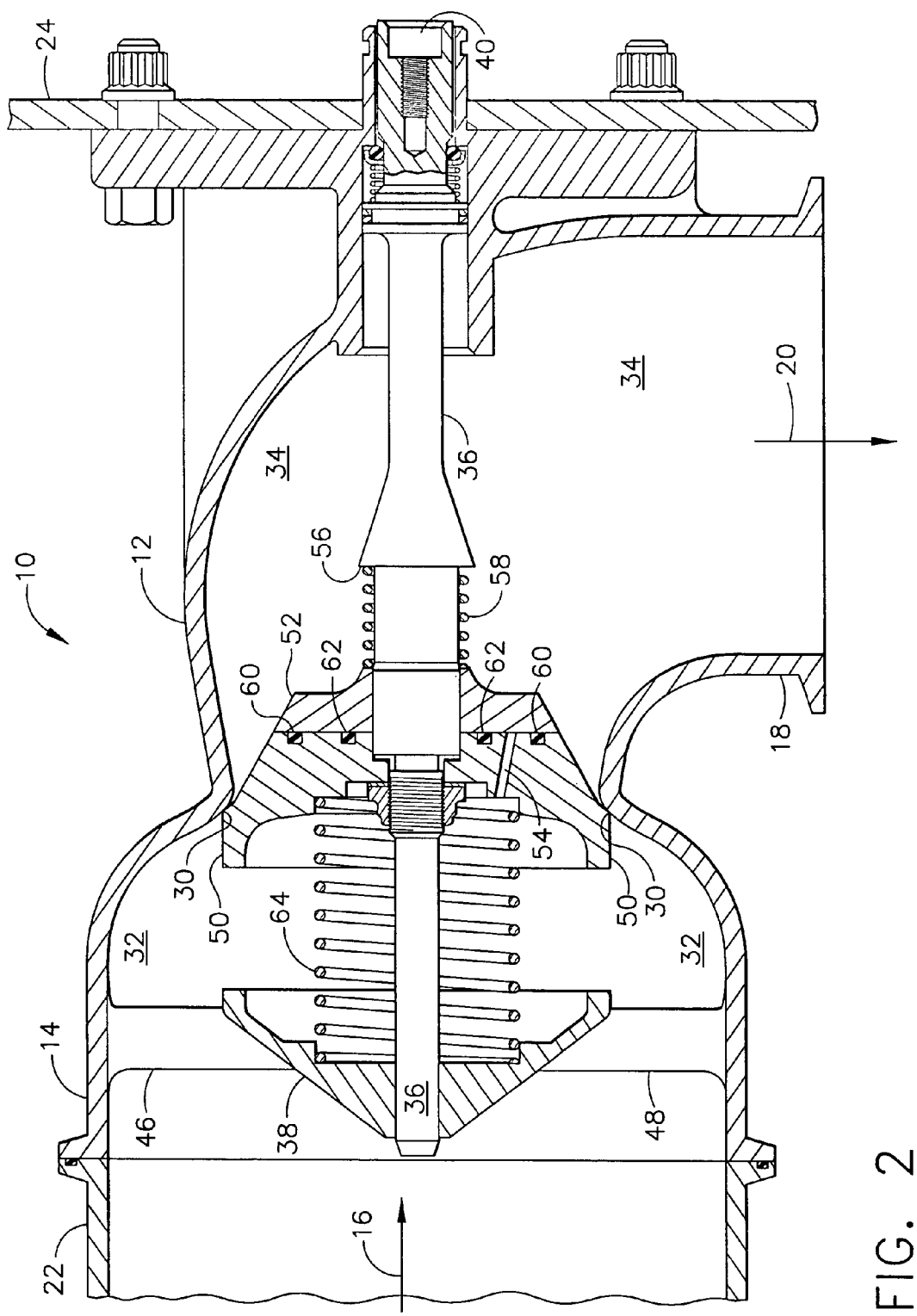
FIG. 2 is a cross-sectional view of the valve of FIG. 1 shown in a closed position, without surge relief taking place in the valve.

More particularly, and referring to FIG. 2, actuating shaft 36 comprises a shoulder 56 that supports a first compression member 58, for example, a spring. First compression member 58 is disposed between shoulder 56 and second moveable poppet piece 52 to provide biasing, i.e., compression force to second moveable poppet piece 52. First compression member 58 is selected to compress at a pressure higher than a preselected maximum operating pressure at inlet port 16, so under normal conditions, fluid is prevented from passing through fluid discharge port or ports 54 in first moveable poppet piece 50 when fill valve apparatus 10 is closed, as shown in FIG. 2. In this condition, first moveable poppet piece 50, which is fixedly engaged with actuating shaft 36, is seated against shoulder 56. Second moveable poppet piece 52 is slideably engaged with actuating shaft 36, but is held against first moveable poppet piece 50 by the compression force of compressible member 58. Thus, a flow of fluid through fill valve apparatus 10 is completely shut off.

Figure 3:
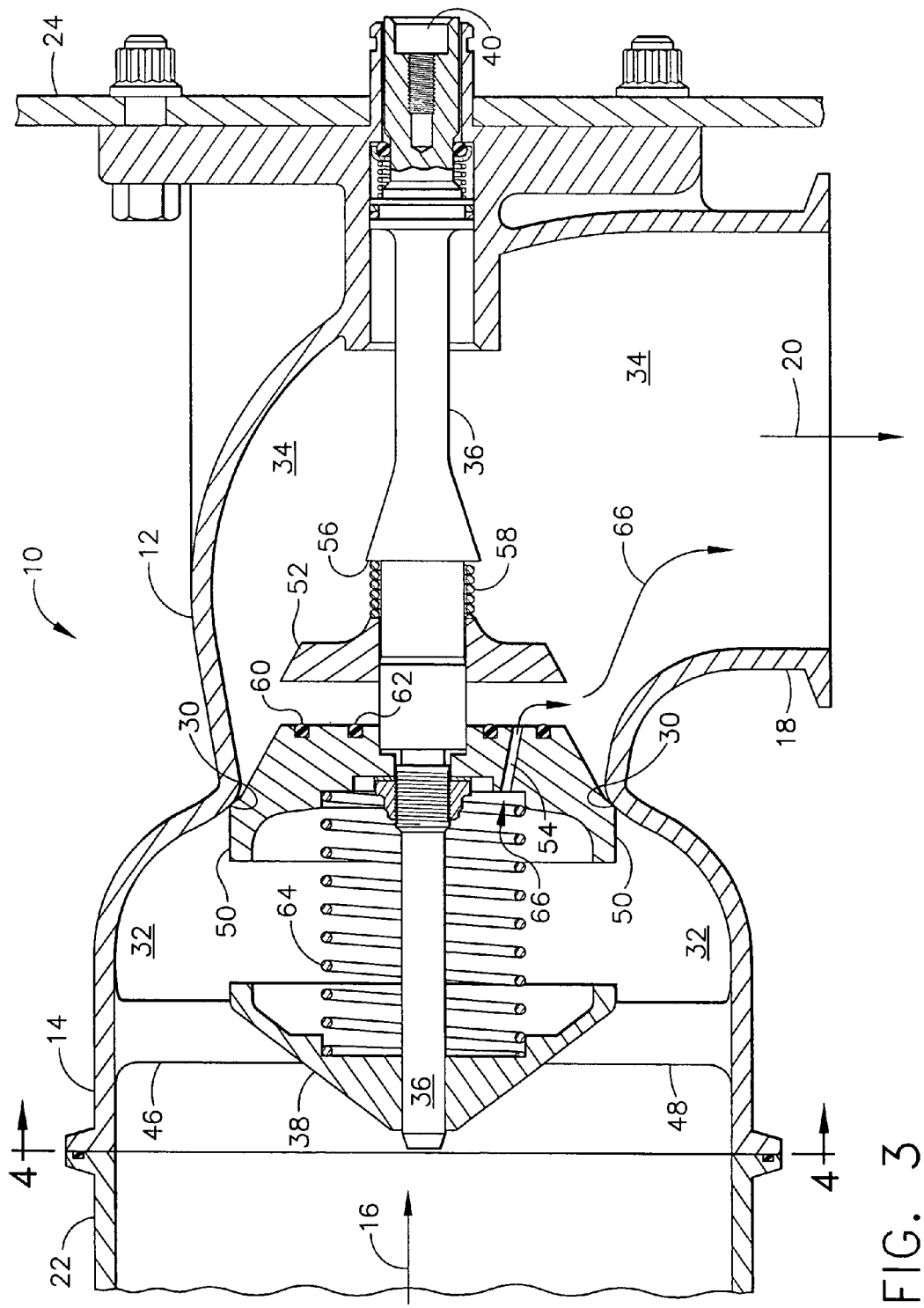
FIG. 3 is a cross-sectional view of the valve of FIG. 1 shown in a closed position, as surge relief takes place.

When actuating mechanism 40 shuts off fill valve apparatus 10, a surge pressure is generated. To prevent the "water hammer" effect (so-called even though the liquid through fill valve 10 need not be water), first compression member 58 is configured to disengage second moveable poppet piece 52 from first moveable poppet piece 50 in the presence of a surge pressure when fill valve apparatus 10 is set to the closed position. In this manner, second moveable poppet piece 52 is responsive to a surge pressure when fill valve apparatus 10 is closed to unseal at least one surge discharge port 54 temporarily to relieve the surge pressure. In various configurations, disengagement of second moveable poppet piece 52 from first moveable poppet piece 50 results from liquid pressure in upstream chamber 32 increasing to a level at which a force against second moveable poppet piece 52 from fluid in fluid discharge port or ports 54 is sufficient to result in a temporary compression of first compression member 58, as shown in FIG. 3. Second moveable poppet piece 52 thus slides away from first moveable poppet piece 50 and a small amount of fluid thus flows 66 from upstream chamber 32 and input port 16 to downstream chamber 34 and output port 20 to relieve the surge pressure. When the surge pressure is relieved, first compression member 58 expands and again compresses second moveable poppet piece 52 against first moveable poppet piece 50, thereby compressionally resealing fluid discharge port or ports 54 and preventing passage of fluid through fill valve apparatus 10. Thus, second movable poppet piece 52 is responsive to a surge pressure for opening surge relief port or ports 54 to allow fluid to flow between fluid input means comprising inlet port 16 and fluid output means comprising fluid output port 20 to relieve surge pressure.

To prevent leakage, in various configurations, at least one compressible sealing member 60 (such as an O-ring, a rubber or elastic washer, etc.) is seated on either first moveable poppet piece 50 or second moveable poppet piece 52 and is configured to prevent fluid flow through fluid discharge port or ports 54 between upstream chamber 32 and downstream chamber 34 when first moveable poppet piece 50 is engaged with second moveable poppet piece 52, as shown in FIG. 2. In various configurations, two or more compressible sealing members such as O-rings 60 and 62 are used. The configuration shown in FIG. 2 has both O-rings 60 and 62 seated on a surface of first moveable poppet piece 50. O-ring 60 prevents fluid from discharging into downstream chamber 34, as does O-ring 62, which prevents seepage along actuating shaft 36.

Also in various configurations of fill valve apparatus 10, a second compression member 64, such as a spring, is coupled between fixed poppet piece 38 and first moveable poppet piece 50 to compressionally bias first moveable poppet piece 50 in a closed position, as shown in FIG. 2. The compressional bias applied by second compression member 64, as well as the compressional bias applied by first compression member 58, provides a failure mode for fill valve apparatus 10 in which fill valve apparatus is in the closed position shown in FIG. 2.

In other configurations of the present invention, a method is provided for relieving a pressure surge in a flow of fluid when a valve 10 is closed. The method includes passing a flow of fluid 26, 28 through a valve housing 12 as in FIG. 1. Then, valve 10 is closed by sealing a first moveable poppet piece 50 against a poppet seat 30 within valve housing 12 to close valve 10 and thereby generate a pressure surge. At least one surge relief port 54 through first moveable poppet piece 50 is then opened in response to the pressure surge as shown in FIG. 2, and surge relief port or ports 54 are closed again, as shown in FIG. 3, when the pressure surge is relieved. In some configurations, opening port or ports 54 comprises compressing a first compression member 58 to move second moveable poppet piece 52 to open surge relief port or ports 54. This compression occurs, in some configurations, as a result of the pressure surge acting through port or ports 54. Also, closing surge relief port or ports 54 through first moveable poppet piece 50 comprises releasing the compression on first movable poppet piece 50. The releasing of the compression occurs, in some configurations, as a result of the relief of the pressure surge.

In some configurations, the method also includes applying a bias to first moveable poppet piece 50 utilizing a second compressible member or spring 64, so that first moveable poppet piece 50 is biased in a closed position. The liquid passing through valve housing 12 in some configurations comprises a flow of aircraft fuel.

Figure 4:
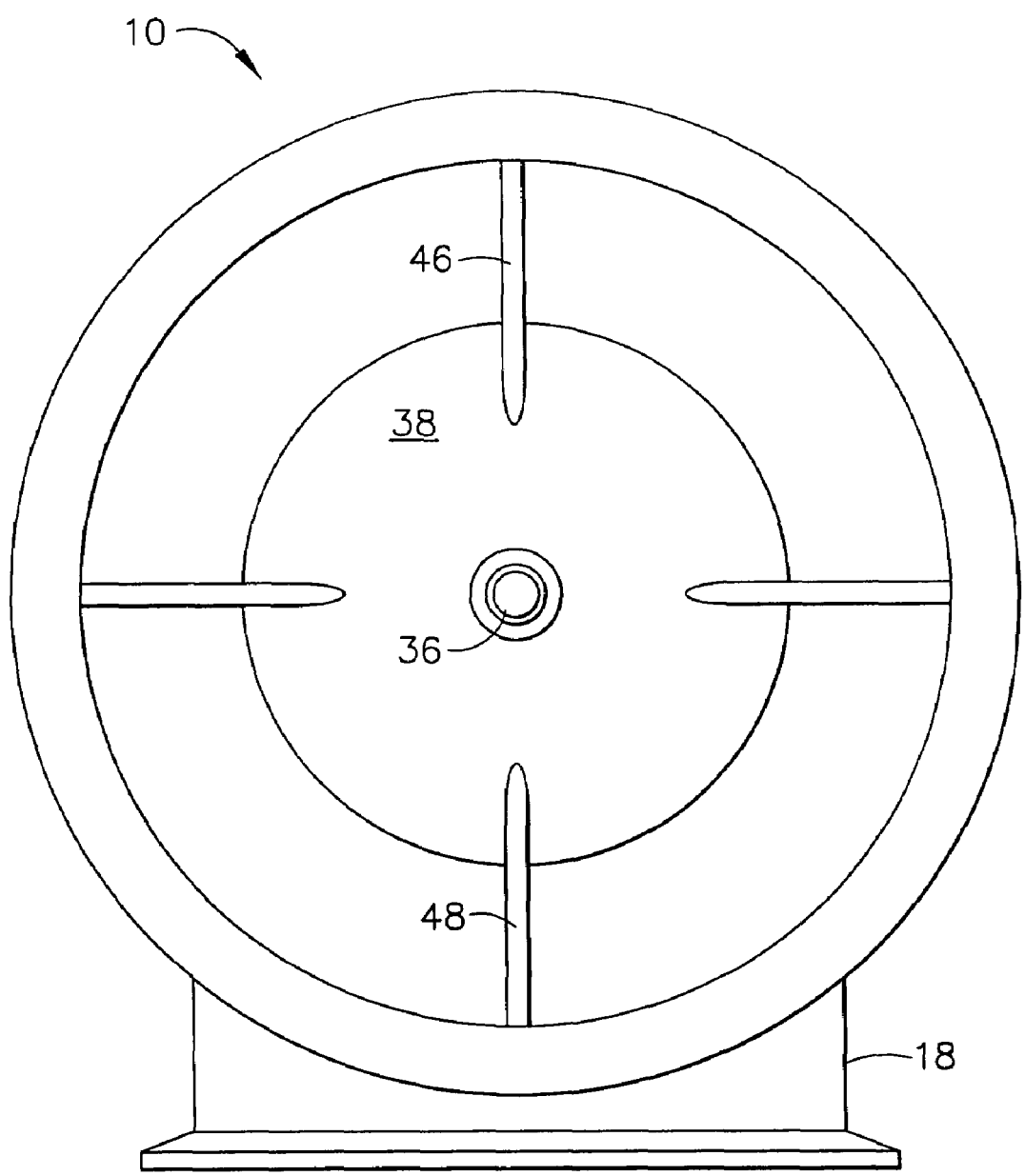
FIG. 4 is a cross-sectional view of the valve of FIG. 3, as viewed from line 4—4 in FIG. 3.

FIG. 4 is a cross-sectional view of the valve configuration of FIG. 3, as viewed from line 4—4 in FIG. 3.

Various configurations of the present invention can thus be seen to reduce or eliminate the need for externally attached surge relief valves. In addition, various configurations of the present invention offer resistance to damage during installation, because these configurations do not require attachments external to a valve or fill line to operate. Moreover, because they are incorporated into the valve itself, various configurations of the present invention can be located at the source of a surge, thereby reducing the likelihood and intensity of such surges. Also, various configurations of the present invention provide surge relief without external discharge of surge relief fluid flow, and thus do not require means for capturing or retaining surge relief fluid. Moreover, various configurations of the present invention can be installed in line, outside of a tank. Moreover, configurations of the present invention are useful to various types of fluid flows, including, but not limited to, fuel flows, aircraft fuel flows, oil flows, and water flows.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for relieving a pressure surge in a flow of fluid when a valve is closed, said method comprising:
    passing a flow of fluid through a valve housing;
    seating a first moveable poppet piece against a poppet seat within the valve housing to close the valve and thereby generate a pressure surge;
    applying a bias to said first moveable poppet piece utilizing a first poppet compression member to bias said first moveable poppet piece in a closed position;
    opening at least one surge relief port through the first moveable poppet piece in response to the pressure surge; and
    closing the at least one surge relief port through the first moveable poppet piece when the pressure surge is relieved.

2. A method in accordance with claim 1 wherein said opening at least one port through the first moveable poppet piece comprises compressing a second poppet compression member to move a second moveable poppet piece to open the at least one surge relief port, and further wherein closing the at least one surge relief port through the first moveable poppet piece comprises releasing the compression on the first compression member.

3. A method in accordance with claim 1 wherein said passing a flow of fluid through a valve housing comprises passing a flow of fuel through the valve housing.

4. A method in accordance with claim 3 wherein said fuel comprises aircraft fuel.

5. A method in accordance with claim 1 wherein said passing a flow of fluid through a valve housing comprises passing a flow of oil through the valve housing.

6. A method in accordance with claim 1 wherein said passing a flow of fluid through a valve housing comprises passing a flow of water through the valve housing.

7. A method of relieving pressure surges within a fluid piping system, said method comprising:
    sealingly engaging a first moveable poppet piece against a poppet seat of a fluid fill valve to substantially prevent a first flow of fluid through the piping system;
    applying a bias to the first moveable poppet piece utilizing a first poppet compression member to bias the first moveable poppet piece in a closed position; and
    disengaging a second moveable poppet piece from the first moveable poppet piece using a second fluid flow through at least one surge relief port in the first moveable poppet piece, the second fluid flow resulting from the pressure surge, thereby relieving the pressure surge.

* * * * *